United States Patent
Danley et al.

(10) Patent No.: US 8,702,322 B1
(45) Date of Patent: Apr. 22, 2014

(54) OPTICAL CONNECTOR WITH ADHESIVE MATERIAL

(71) Applicant: Corning Cable Systems LLC, Hickory, NC (US)

(72) Inventors: Jeffrey Dean Danley, Hickory, NC (US); Robert Bruce Elkins, II, Hickory, NC (US); Darrin Max Miller, Hickory, NC (US); Dennis Craig Morrison, Lincolnton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/908,227

(22) Filed: Jun. 3, 2013

(51) Int. Cl.
*G02B 6/36* (2006.01)
*G02B 6/38* (2006.01)

(52) U.S. Cl.
CPC .............. *G02B 6/3861* (2013.01); *G02B 6/381* (2013.01); *G02B 6/3833* (2013.01); *G02B 6/3855* (2013.01)
USPC .................... 385/80; 385/76; 385/77; 385/78; 385/84

(58) Field of Classification Search
CPC .... G02B 6/381; G02B 6/3833; G02B 6/3855; G02B 6/3861
USPC .......................................................... 385/80
See application file for complete search history.

(56) References Cited

U.S. PATENT DOCUMENTS

| | | | |
|---|---|---|---|
| 4,147,402 A | 4/1979 | Chown | 350/96.18 |
| 4,198,119 A * | 4/1980 | Uberbacher | 385/81 |
| 4,345,930 A | 8/1982 | Basola et al. | 65/102 |
| 4,510,005 A | 4/1985 | Nijman | 156/221 |
| 4,678,268 A | 7/1987 | Russo et al. | 350/96.18 |
| 4,859,827 A | 8/1989 | Coyle, Jr. et al. | 219/121.64 |
| 4,932,989 A | 6/1990 | Presby | 65/2 |
| 5,011,254 A | 4/1991 | Edwards et al. | 350/96.18 |
| 5,101,090 A | 3/1992 | Coyle, Jr. et al. | 219/121.68 |
| 5,226,101 A | 7/1993 | Szentesi et al. | 385/85 |
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/31 |
| 5,421,928 A | 6/1995 | Knecht et al. | 156/153 |
| 5,772,720 A | 6/1998 | Taira-Griffin et al. | 65/387 |
| 5,954,974 A | 9/1999 | Broer et al. | 216/2 |

(Continued)

FOREIGN PATENT DOCUMENTS

| | | | | |
|---|---|---|---|---|
| WO | 01/61394 A1 | 8/2001 | | G02B 6/26 |
| WO | 01/61395 A1 | 8/2001 | | G02B 6/26 |

(Continued)

*Primary Examiner* — Ryan Lepisto
(74) *Attorney, Agent, or Firm* — Adam R. Weeks (57) ABSTRACT

An optical fiber connector preloaded with an adhesive is provided. The optical connector includes an optical fiber-receiving passage. The passage includes a first passage section extending inwardly from the first face, and the first passage section has a first width. The passage includes a second passage section extending inwardly from the second face, and the second passage section has a second width. The second width is less than the first width. The passage includes a transition passage section located between the first passage section and the second passage section. The transition passage has a variable width, and the variable width of the transition section decreases as the distance to the second face decreases. A meltable adhesive composition is located within the transition passage section and is configured to bind an optical fiber to an inner surface of the second passage following melting and solidification of the adhesive composition.

30 Claims, 5 Drawing Sheets

(56) References Cited

U.S. PATENT DOCUMENTS

| | | | |
|---|---|---|---|
| 5,966,485 A | 10/1999 | Luther et al. | 385/85 |
| 6,139,196 A | 10/2000 | Feth et al. | 385/97 |
| 6,246,026 B1 | 6/2001 | Vergeest | 219/121.72 |
| 6,282,349 B1 | 8/2001 | Griffin | 385/81 |
| 6,361,219 B1 | 3/2002 | Blyler, Jr. et al. | 385/85 |
| 6,413,450 B1 | 7/2002 | Mays, Jr. | 264/1.27 |
| 6,492,443 B1 * | 12/2002 | Kodemura et al. | 524/114 |
| 6,509,547 B1 | 1/2003 | Bernstein et al. | 219/121.68 |
| 6,534,741 B2 | 3/2003 | Presby | 219/121.69 |
| 6,738,544 B2 | 5/2004 | Culbert et al. | 385/33 |
| 6,742,936 B1 | 6/2004 | Knecht et al. | 385/67 |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,121,734 B2 | 10/2006 | Taira | 385/78 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,341,383 B2 | 3/2008 | Droege et al. | 385/78 |
| 7,377,700 B2 | 5/2008 | Manning et al. | 385/72 |
| 7,419,308 B2 | 9/2008 | Ma | 385/54 |
| 7,452,137 B2 | 11/2008 | Droege et al. | 385/60 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 2002/0186934 A1 * | 12/2002 | Hug et al. | 385/80 |
| 2004/0047567 A1 * | 3/2004 | Gimbel et al. | 385/80 |
| 2004/0234211 A1 | 11/2004 | Durrant et al. | 385/88 |
| 2005/0008307 A1 | 1/2005 | Culbert et al. | 385/123 |
| 2005/0284852 A1 | 12/2005 | Vergeest et al. | 219/121.67 |
| 2006/0137403 A1 | 6/2006 | Barr et al. | 65/377 |
| 2006/0266743 A1 | 11/2006 | Chi et al. | 219/121.69 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |
| 2013/0089294 A1 | 4/2013 | Zimmel | 385/80 |

FOREIGN PATENT DOCUMENTS

| | | | |
|---|---|---|---|
| WO | 01/61870 A2 | 8/2001 | |
| WO | 2004/003612 A1 | 1/2004 | G02B 6/25 |
| WO | 2008/103239 A1 | 8/2008 | B23K 26/00 |

* cited by examiner

OPTICAL CONNECTOR WITH ADHESIVE MATERIAL

BACKGROUND

The disclosure relates generally to optical fiber connectors and more particularly to optical fiber connectors having adhesives for coupling to the optical fibers. Optical fibers have seen increased use in a wide variety of electronics and telecommunications fields. Optical fibers can be coupled to an optical connector (e.g., a ferrule). The connector allows the optical fiber to be coupled to a wide variety of devices, for example, various electronic devices, other optical fibers, etc.

No admission is made that any reference cited herein constitutes prior art. Applicant expressly reserves the right to challenge the accuracy and pertinence of any cited documents.

SUMMARY

One embodiment of the disclosure relates to an optical fiber connector preloaded with an adhesive. The optical connector includes a body having a first face and a second face, and a fiber-receiving passage defined in the body that extends between a first opening formed in the first face and a second opening formed in the second face. The fiber receiving passage is configured to receive an optical fiber. The passage includes a first passage section extending inwardly from the first face, and the first passage section has a first width. The passage includes a second passage section extending inwardly from the second face, and the second passage section has a second width. The second width is less than the first width. The passage includes a transition passage section located between the first passage section and the second passage section. The transition passage has a variable width, and the variable width of the transition section decreases as the distance to the second face decreases. The optical fiber connector includes a meltable adhesive composition located within the transition passage section, and the adhesive composition is configured to bind an optical fiber to an inner surface of the second passage following melting and solidification of the adhesive composition.

An additional embodiment of the disclosure relates to an optical fiber connector configured to be coupled to an optical fiber. The connector includes a body having a first face, a second face opposing the first face, a length between the first face and the second face and an outer diameter. The connector body is an integral, single body extending between the first face and the second face. The connector includes a through bore extending from the first face to the second face. The through bore includes a first section extending inwardly from the first face, and the first section has a first diameter. The through bore includes a second section extending away from the first section to the second face, and the second passage section has an entrance opening facing the first section, an exit opening formed in the second face and a second diameter. The first diameter is at least twice the second diameter. The through bore includes a frustoconical section located between the first section and the second section, and the frustoconical section provides the transition from the first diameter of the first section to the second diameter of the second section. The connector includes a solid powdered adhesive composition coupled to the body within the frustoconical section adjacent the entrance opening of the second section via compression of the solid powdered adhesive within the frustoconical section. The solid powdered adhesive composition includes a cross-linkable resin.

An additional embodiment of the disclosure relates to an optical fiber connector preloaded with an adhesive including a body having a first face, a second face and an outer diameter. The connector includes a fiber-receiving passage defined in the body that extends between a first opening formed in the first face and a second opening formed in the second face. The fiber receiving passage is configured to receive an optical fiber. The passage includes a first passage section extending inwardly from the first face to an inner end, and the first passage section has a first diameter and extends more than half an axial length of the body. The first diameter is between 30% and 50% of the outer diameter of the body. The passage includes a tapered section extending from the inner end of the first passage section, and a second passage section extending from a narrow end of the tapered section to the second face. The second passage section has a second diameter, and the first diameter is at least twice the second diameter. The connector includes a meltable solid powdered adhesive composition coupled to the body within the tapered section via compression. The meltable solid powdered adhesive composition includes a cross-linkable resin and has a melting point greater than 290 degrees C., and at least 50% of the meltable solid powdered adhesive composition is located within the tapered section.

An additional embodiment of the disclosure relates to an optical fiber connector that includes a body having a first face and a second face. The optical fiber connector includes a fiber-receiving passage defined in the body that extends between a first opening formed in the first face and a second opening formed in the second face. The optical fiber includes an adhesive composition located within the fiber-receiving passage at a position between the first opening and the second opening. The temperature of the body at the first face is less than 250 degrees C. and the temperature of the body at the position of the meltable adhesive composition is greater than 290 degrees C.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical connector preloaded with an adhesive composition are shown. Generally, the optical connector includes a central fiber receiving passage or through bore that extends between a first face and a second face. The fiber receiving passage includes a large diameter passage section extending inwardly from the first face and a small diameter passage section or micro-hole section extending inwardly from the second face of the connector. The micro-hole section is sized to receive an optical fiber with a small amount of clearance between the outer surface of the optical fiber and the inner surface of the micro-hole. A transition section is located between the large diameter passage section and the micro-hole and may be a tapered or frustoconical section providing the transition from the large diameter passage section to the smaller diameter of the micro-hole.

A meltable, substantially solid adhesive composition is preloaded into the optical connector and is maintained primarily in the transition section and/or in the large diameter passage section. When the optical connector is to be coupled to an optical fiber, heat may be focused on the optical connector, e.g., via laser, at the location containing the preloaded adhesive composition causing the adhesive composition to melt. With the adhesive melted, the optical fiber is passed through the connector from the first face to the second face, and the optical fiber passes through the melted adhesive composition pulling the melted adhesive into the micro-hole along with the optical fiber. The angle of the transition section acts to guide the tip of the optical fiber into the micro-hole and also acts to funnel the melted adhesive composition into the micro-hole. The large diameter passage and of the transition section (as compared to that of the micro-hole) provide sufficient space to store the adhesive composition within the bore of the connector prior to heating.

As discussed in more detail below, the meltable adhesive compositions loaded into the connector may be an adhesive that melts at relatively high temperatures (e.g., temperatures over 290 degrees Celsius), and also solidifies, hardens or cures quickly once cooled. Because the adhesive compositions discussed herein solidify quickly following heating to bind the optical fiber within the connector, the optical connectors discussed herein may substantially increase the speed at which optical fibers can be coupled to the connector. As compared to typical optical fiber connector adhesives that require relatively long amounts of time to cure to bind the connector to the fiber, the fast solidification of the adhesives located within the connectors discussed herein may provide substantially increased throughput during fiber connector attachment. Increased throughput may also allow single piece flow through during optical fiber connector processing (rather than the batch processing caused by long adhesive cure times). Further, the meltable adhesive compositions discussed herein may be a stable composition in a solid, solid powdered or other stable form such that the adhesive composition may be loaded into the passage of the connector a long time (e.g., more than 1 day, more than a week, more than a year) before melting of the adhesive and coupling to the optical fiber. Thus, the optical connector and preloaded adhesive may eliminate the need to inject or otherwise place an adhesive into the optical connector immediately prior to insertion of the optical connector.

Figure 1:
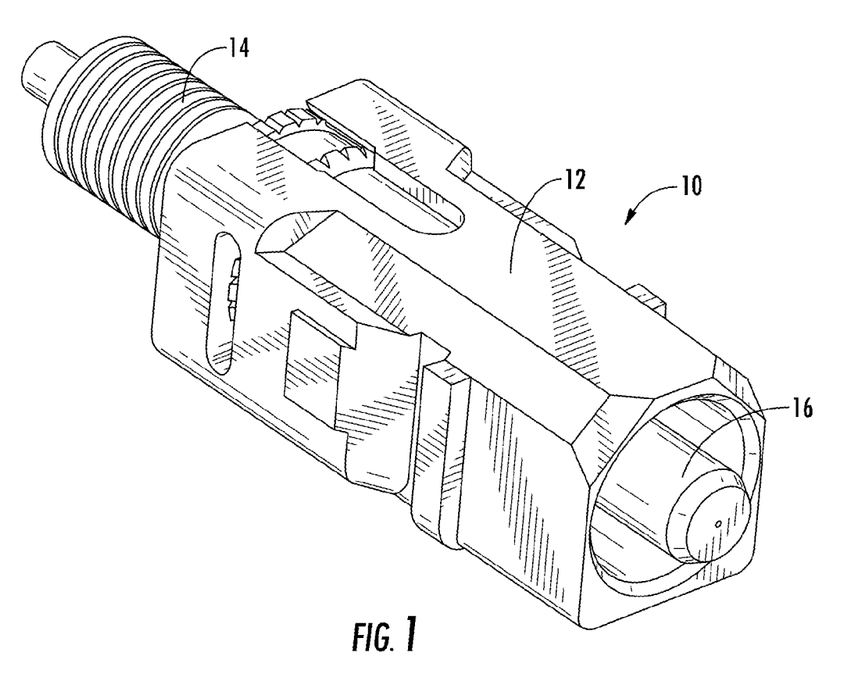
FIG. 1 shows an optical connector according to an exemplary embodiment.

Referring to FIG. 1, a mechanical, optical fiber connector assembly 10 is shown according to an exemplary embodiment. Generally, assembly 10 includes a housing 12 and a crimp body 14. Located within housing 12 is optical fiber connector, shown as ferrule 16. Generally, connector assembly 10 holds ferrule 16 during the various processing steps needed to couple ferrule 16 to an optical fiber.

Figure 2:
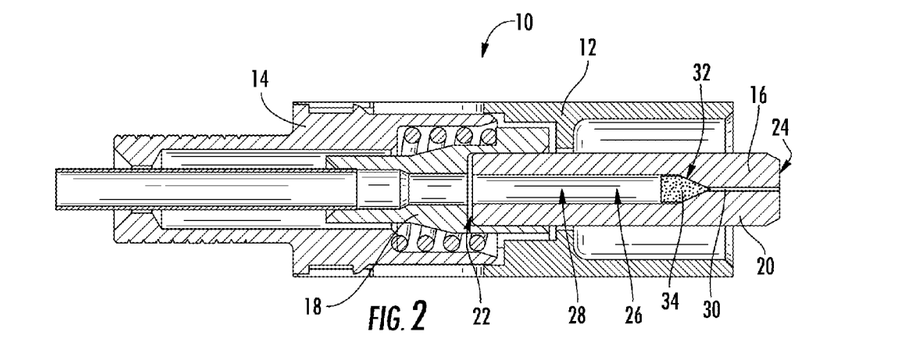
FIG. 2 shows a cross-section of an optical connector according to an exemplary embodiment.

Referring to FIG. 2, a cross-sectional view of connector assembly 10 is shown. Connector assembly 10 includes a ferrule holder 18 located within housing 12. Ferrule holder 18 engages the outer surface of ferrule 16 holding ferrule 16 in place.

As shown, ferrule 16 generally includes a body 20. In the embodiment shown, body 20 is a substantially cylindrical body including a first face 22 and a second face 24. A fiber receiving passage, shown as central bore 26, extends through body 20 and between first face 22 and second face 24. Central bore 26 includes a first section, shown as bore section 28, a second section, shown as micro-hole 30, and a transition section, shown as tapered section 32. Generally, bore section 28 has a diameter greater than the diameter of micro-hole 30, and tapered section 32 has a diameter that decreases as the distance to second face 24 decreases (e.g., in the direction from left to right in the orientation of FIG. 2). The decreasing diameter of tapered section 32 provides the transition from the larger diameter of bore section 28 to the smaller diameter of micro-hole 30. In the embodiment shown, body 20 is a single, integral piece of material through which bore 26 is formed.

An adhesive composition or bonding agent, shown as adhesive plug 34, is located within central bore 26 of ferrule 16. As discussed in more detail below, the adhesive composition of adhesive plug 34 is a meltable material configured to bond an optical fiber to ferrule 16 within micro-hole 30. In various embodiments, adhesive plug 34 is a substantially solid body or solid powder formed from a meltable adhesive composition that may be preloaded or stored within ferrule 16 for a significant amount of time (e.g., an hour, a day, a year, etc.) before an optical fiber is to be coupled to ferrule 16. In one such embodiment, adhesive plug 34 may be formed within ferrule 16 by the manufacture of the ferrule.

As shown, adhesive plug 34 is located primarily within tapered section 32 and within the inner end of bore section 28 and is positioned adjacent the entrance to micro-hole 30 from tapered section 32. In one embodiment, when ferrule 16 is at normal processing temperatures or at room temperature (e.g., between about 15 degrees C. and 30 degrees C., less than 40 degrees C., etc.), adhesive plug 34 is substantially solid such that it extends between opposing inner surfaces of tapered section 32 and substantially blocks the opening into micro-hole 30 from tapered section 32.

Figure 3:
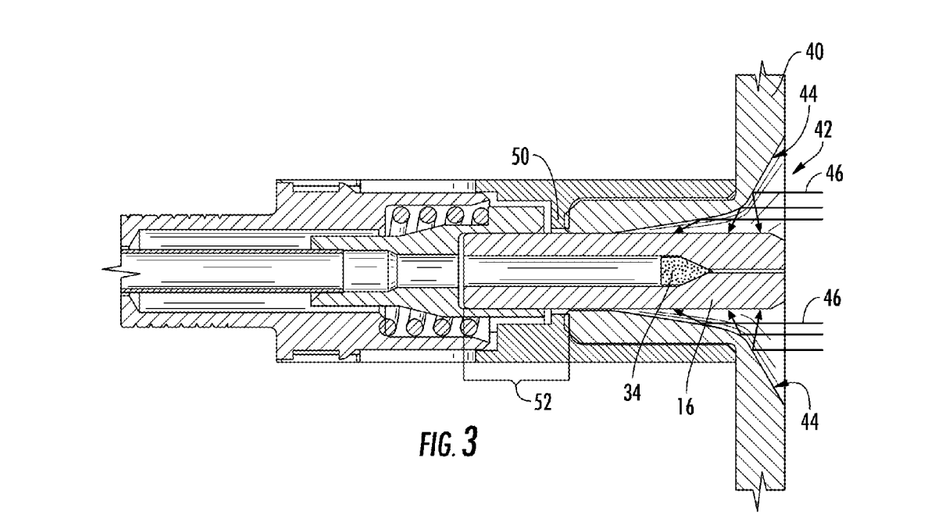
FIG. 3 shows a cross-section of an optical connector during heating according to an exemplary embodiment.
Figure 4:
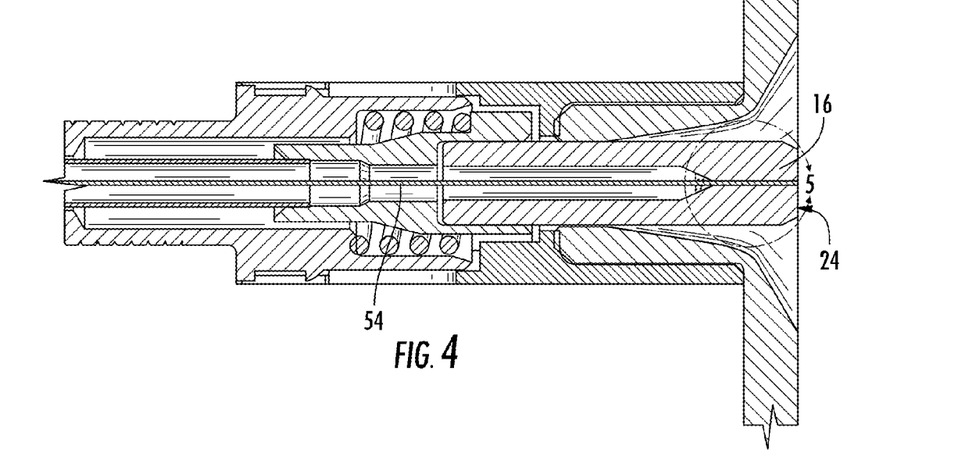
FIG. 4 shows a cross-section of an optical connector during fiber insertion according to an exemplary embodiment.
Figure 5:
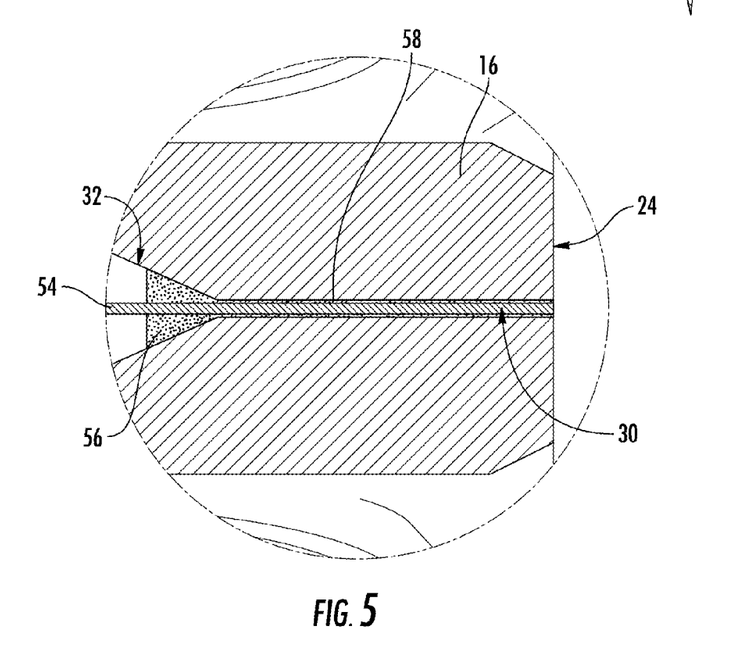
FIG. 5 is a detailed view of fiber insertion within a microhole of a ferrule according to an exemplary embodiment.

Referring generally to FIGS. 3-5, melting of adhesive plug 34 and coupling of an optical fiber to ferrule 16 is shown according to an exemplary embodiment. Referring to FIG. 3, in one embodiment, connector assembly 10 is configured to be used in conjunction with a heating system that focuses heat onto ferrule 16 in such a way that adhesive plug 34 is melted without first face 22 and/or approximately the first third of body 20 of ferrule 16 adjacent first face 22 reaching a temperature high enough to damage housing 12 and/or crimp body 14.

Referring to FIG. 3, ferrule 16 is shown supported by heating port 40. Heating port 40 includes an opening 42, and when supported within heating port 40, second face 24 of ferrule 16 extends through opening 42. Heating port 40 includes a reflector 44 that surrounds opening 42. Reflector 44 includes angled reflective surfaces that are positioned relative to ferrule 16 to focus heat onto a portion of ferrule 16 to melt adhesive plug 34. In one embodiment, heating may be accomplished by $CO_2$ laser beams 46 that are focused on to approximately the front third of ferrule 16 (i.e., the third of ferrule 16 adjacent second face 24) by reflector 44.

In various embodiments, heat is focused onto the portion of ferrule 16 that includes adhesive plug 34 and micro-hole 30 such that adhesive plug 34 is melted while heating of other areas of ferrule 16 is limited. In one embodiment, during heating, the portion of ferrule 16 including adhesive plug 34 is heated to above 290 degrees Celsius (degrees C.) while the temperature of first face 22 of ferrule 16 remains below 250 degrees C. In another embodiment, during heating, the portion of ferrule 16 including adhesive plug 34 is heated to above 350 degrees C. while the temperature of first face 22 of ferule 16 remains below 250 degrees C. In another embodiment, during heating, the portion of ferrule 16 including adhesive plug 34 is heated to above 400 degrees C. while the temperature of first face 22 of ferule 16 remains below 250 degrees C. In another embodiment, during heating, the portion of ferrule 16 including adhesive plug 34 is heated to above 350 degrees C. while the temperature of first face 22 of ferule 16 remains below 200 degrees C. In another embodiment, during heating, the portion of ferrule 16 including adhesive plug 34 is heated to between 400 and 600 degrees C. while the temperature of first face 22 of ferule 16 remains below 250 degrees C.

In one embodiment, housing 12 includes a clamping member 50, and in such embodiments, ferrule 16 includes an inner portion 52 that is the portion of ferrule 16 located inward from clamping member 50 within housing 12. In the orientation of FIG. 3, inner portion 52 of ferrule 16 is the portion of ferrule 16 located to the left of clamping member 50. In such embodiments, during heating and melting of adhesive 34, inner portion 52 of ferrule 16 is maintained below a temperature that will damage housing 12. In one such embodiment, the portion of ferrule 16 including adhesive plug 34 is heated to above 290 degrees C. while the temperature of inner portion 52 of ferule 16 remains below 250 degrees C. In another embodiment, the portion of ferrule 16 including adhesive plug 34 is heated to above 290 degrees C. while the temperature of inner portion 52 of ferule 16 remains below 200 degrees C. In another embodiment, the portion of ferrule 16 including adhesive plug 34 is heated to above 350 degrees C. while the temperature of inner portion 52 of ferule 16 remains below 200 degrees C. In another embodiment, the portion of ferrule 16 including adhesive plug 34 is heated to between 400 and 600 degrees C. while the temperature of inner portion 52 of ferule 16 remains below 200 degrees C.

It is believed that the larger diameter of bore section 28 (as compared to the smaller diameter of micro-hole 30) results in a large portion of the volume of ferrule 16 being filled with air, and the air with ferrule 16 may act as a buffer or insulator to heat transfer along the length of ferrule 16. Thus, it is believed that the insulating effect of the air within bore section 28 contributes to maintaining inner portion 52 of ferrule 16 at a low temperature during heating, as discussed above. It should be understood that the temperature to which the portion of ferrule including the adhesive is heated will be based upon the melting temperature of the particular adhesive composition located within in ferrule 16.

Referring to FIG. 4 and FIG. 5, once adhesive plug 34 has been heated above its melting temperature (e.g., 290 degrees C., 350 degrees C., 400 degrees C., etc.), the adhesive becomes flowable, allowing an optical fiber 54 to be inserted through central bore 26 of ferrule 16. As shown, optical fiber 54 is inserted into bore 26 in the direction from first face 22 toward second face 24. Optical fiber 54 passes through larger diameter bore section 28 and then encounters the flowable adhesive material 56 (i.e., the melted adhesive plug 34). Optical fiber 54 passes through tapered section 32 and into micro-hole 30. Tapered section 32 acts to funnel or direct the melted adhesive composition 56 into micro-hole 30, and the viscosity of melted adhesive composition 56 allows optical fiber 54 to pull adhesive 56 into micro-hole 30. Thus, as optical fiber 54 passes through micro-hole 30 a thin layer of adhesive 58 surrounds the outer surface of optical fiber 54 and fills the space between optical fiber 54 and the inner surface of micro-hole 30. Then with optical fiber 54 in place, ferrule 16 is cooled allowing the melted adhesive to solidify, bonding optical fiber 54 in place within micro-hole 30. Following solidification of the adhesive, the additional steps to finish the connector (e.g., polishing of optical fiber 54 at second face 24) can be performed. In some embodiments, ferrule 16 may be actively cooled, for example by blowing air, to speed the cooling and solidification process.

Figure 6:
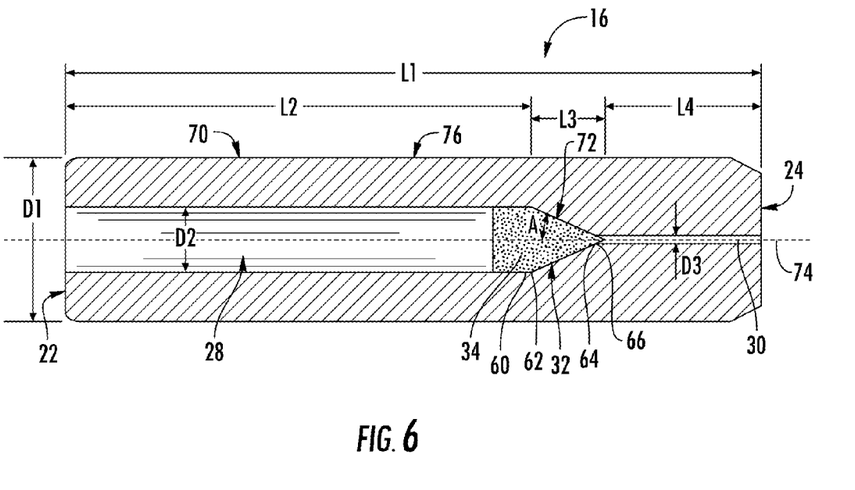
FIG. 6 shows a cross-section of an optical connector according to an exemplary embodiment.

Referring to FIG. 6, a detailed view of ferrule 16 including adhesive plug 34 is shown according to an exemplary embodiment. As noted above, ferrule 16 includes a central bore 26 that extends from first face 22 to second face 24. In the embodiment shown, first face 22 and second face 24 each define planes and the planes are substantially parallel to each other. However, in other embodiments, first face 22 and/or second face 24 may define planes positioned at an angle relative to each other (i.e., non-parallel planes). In other embodiments, first face 22 and/or second face 24 may not be planar surfaces, and for example may be convex or concave surfaces.

Central bore 26 includes a larger diameter bore section 28 that extends from first face 22 to an inner end 60. Inner end 60 of bore section 28 transitions into a first end 62 of tapered section 32. Tapered section 32 extends from first end 62 to a second end 64 of tapered section 32, and second end 64 transitions into an inner end 66 of micro-hole 30. Micro-hole 30 extends from inner end 66 to second face 24. Thus, in this manner, bore section 28, micro-hole 30 and tapered section 32 define a contiguous fiber receiving passage that extends from first face 22 to second face 24.

In various embodiments, ferrule 16 and in particular the structural arrangement, positioning and relative sizing of the portions of central bore 26 provide a ferrule having the various functional characteristics discussed herein. In the embodiment shown, ferrule 16 is substantially cylindrical having an outer surface 70 having an outer diameter shown as D1, and bore section 28 and micro-hole 30 are substantially cylindrical bores each having a substantially constant diameter along their lengths. In FIG. 6, the inner diameter of bore section 28 is shown as D2, and the inner diameter of micro-hole 30 is shown as D3. It should be understood that in other embodiments, outer surface 70, bore section 28 and micro-hole 30 may have non-circular cross-sectional shapes (e.g., elliptical, square, rectangular, triangular, etc.), and in such embodiments, outer surface 70, bore section 28 and micro-hole 30 will have widths that substantially match the various embodiments of D1, D2 and D3 discussed herein.

In various embodiments, the sizing of the diameter of bore section 28, D2, may allow for the easy or efficient insertion of adhesive material into ferrule 16 to form adhesive plug 34. Further, as noted above the large diameter, D2, relative to outer diameter D1 provides a large interior cavity that holds air during heating of ferrule 16 which may act as a buffer or insulator limiting heating of inner section 52 of ferrule 16. In addition, D3 is sized to closely match the outer diameter of fiber 54 but to allow enough space for adhesive to bond fiber 54 within micro-hole 30.

In various embodiments, D2 is between 20% and 80% of D1, specifically is between 20% and 60% of D1, and more specifically is between 30% and 50% of D1. In a specific embodiment, D2 is about 40% of D1. In addition, in various embodiments, D2 is greater than twice D3, specifically is greater than four times D3 and more specifically is between 7 and 9 times D3. In one embodiment, D3 is between 0.1255 mm and 0.1260 mm. In one embodiment, D2 is between 0.250 mm and 1.0 mm, and in another embodiment, D2 is between 0.500 mm and 1.0 mm. In a specific embodiment, D1 is about 2.5 mm, D2 is about 1 mm, and D3 is about 0.1255 mm. In another specific embodiment, D1 is about 1.25 mm, and D3 is about 0.1255 mm.

Tapered section 32 has a decreasing diameter from left to right in the orientation of FIG. 6 (e.g., the diameter of tapered section 32 decreases as the distance to second face 24 decreases), and the decreasing diameter of tapered section 32 provides the transition from D2 to D3. In the embodiment shown, tapered section 32 is a substantially frustoconical shaped section having an inner surface 72 positioned at an angle A relative to the longitudinal axis 74 of ferrule 16. In various embodiments, angle A is between 30 degrees and 80 degrees, specifically is between 50 degrees and 70 degrees, and more specifically is about 60 degrees.

While FIG. 6 shows the transition section of central bore 26 as a frustoconical, tapered section 32 having a diameter that is proportional (e.g., linearly related) to the distance to second face 24, in other embodiments, inner surface 72 may have other shapes that generally having decreasing diameters as the distance to second face 24 decreases. For example, surface 72 may include steps of decreasing diameter or may be a surface having a continuously curved but nonlinear relation to the distance to second face 24. As noted above, the decreasing diameter of tapered section 32 acts to funnel melted adhesive into micro-hole 30 and also acts to guide fiber 54 into micro-hole 30 during insertion.

Further, the relative lengths of ferrule 16, bore section 28, micro-hole 30 and tapered section 32 may further contribute to the functionalities discussed herein. For example, the relative lengths structurally allow for the placement of adhesive plug 34 adjacent micro-hole 30. As discussed above, such placement may allow ferrule to be heated to melt adhesive plug 34 while limiting heating of the inner portion of ferrule 16.

As shown, ferrule 16 has an axial length L1, bore section 28 has an axial length L2, tapered section 32 has an axial length L3 and micro-hole 30 has an axial length L4. As shown, L2 is greater than L3 and L4, and L4 is greater than L3. In various embodiments, L2 is greater than 50% L1, specifically is greater than 55% of L1, and more specifically is greater than 60% of L1. In various embodiments, L2 is between 50% and 70% of L1. In various embodiments, L4 is less than 40% of L1, specifically is less than a third of L1 and more specifically is less than 30% of L1. In various embodiments, L4 is between 20% and 40% of L1. In various embodiments, L3 is less than 30% of L1, specifically is less than 20% of L1 and more specifically is less than 10% of L1. In various embodiments, L3 is between 5% and 15% of L1. In various embodiments L1 is between 5 mm and 11 mm. In specific embodiments, L1 is about 10.5 mm, and is about 6.5 mm. In various embodiments, L2 is between 3 mm and 9 mm, and specifically is between 4 mm and 8.5 mm. In specific embodiments, L2 is about 6.5 mm, about 8.5 mm and 4 mm. In various embodiments, L3 is between 0.5 mm and 3 mm, and specifically is about 1 mm. In a specific embodiment, L4 is between 1 mm and 5 mm, and specifically, is about 3 mm.

In the embodiment shown, adhesive plug 34 is located primarily within tapered section 32 and bore section 28 adjacent its inner end 60. In the embodiment shown, a small portion of adhesive plug 34 may extend into micro-hole 30 such that adhesive material of plug 34 substantially blocks the opening between tapered section 32 and micro-hole 30 prior to melting of the adhesive.

In the embodiment shown, all of the adhesive plug 34 is located within central bore 26 between axial midpoint 76 and second face 24. In various embodiments, prior to melting of plug 34, at least 80% of adhesive plug 34 is located between axial midpoint 76 and second end 64 of tapered section 32, specifically at least 90% of adhesive plug 34 is located between axial midpoint 76 and second end 64 of tapered section 32, and more specifically at least 95% of adhesive plug 34 is located between axial midpoint 76 and second end 64 of tapered section 32. In various embodiments, more than 50% of adhesive plug 34 is located within tapered section 32. In various embodiments, the mass of adhesive plug 34 is between 0.5 mg and 5 mg, specifically between 0.5 mg and 3 mg, and more specifically between 1 mg and 2 mg. In a specific embodiment, the mass of adhesive plug 34 is about 1.2 mg.

In some embodiments, tapered section 32 and the larger diameter of bore section 28 provides a storage area for the adhesive material prior to heating and flowing into micro-hole 30. In some such embodiments, the adhesive material of plug 34 may include particles or pellets of adhesive material having an average diameter sufficiently large compared to the diameter of micro-hole 30, such that placement of the adhesive material into micro-hole 30 prior to melting is not practical. For example, in certain embodiments the average diameter of adhesive particles of adhesive plug 34 is greater than 25% of D3, greater than 50% of D3 or greater than 75% of D3.

In general, adhesive plug 34 may be formed from a wide variety of meltable adhesive compositions. In some embodiments, adhesive plug 34 may be formed from a meltable adhesive that has a relatively high melting point (e.g., over 290 degrees C.). In such embodiments, the high melting temperature corresponds to an adhesive the solidifies relatively quickly (e.g., in less than 30 seconds, less than 20 seconds, less than 15 seconds) once heating is stopped. The low cooling/solidification time allows optical fibers to be coupled to ferrule 16 relatively quickly as compared to ferrules that are coupled using various conventional epoxies that may take as long as 20-30 minutes to cure. In addition, in various embodiments, the adhesive composition of ferrule 16 may be partially cross-linkable such that the adhesive partially cross-links following heating, melting and solidification. Such partially cross-linked adhesives then resist remelting if the ferrule/optical fiber assembly reaches the melt temperature of the adhesive during use. Various embodiments of the adhesive compositions disclosed herein may also have other desirable properties for the process of securing an optical fiber within a ferrule, such as, but not limited to, shortened process cycle time, no required mixing, and/or no potlife issues.

In various embodiments, ferrule 16 may be loaded with adhesive plug 34 at a time and/or location distant from the time and place of fiber attachment. In one embodiment, adhesive plug 34 is loaded into ferrule 16 at a first physical location or facility (e.g., a ferrule manufacturing facility), the adhesive loaded ferrule 16 may then be shipped to a second physical location or facility that couples the ferrule to the optical fiber. Thus, adhesive plug 34 may be coupled within tapered section 32 in various ways such that adhesive plug 34 remains within ferrule 16 during handling, shipping, packaging, etc. of ferrule 16.

In one embodiment, adhesive plug 34 is a solid powdered adhesive composition that is coupled within tapered section 32 via compression of the powdered adhesive prior to being heated or otherwise cured. In another embodiment, the adhesive is extruded or injection molded into tapered section 32, and in such embodiments, the adhesive may include a thermoplastic material. Thus, the ferrules discussed herein may contain the adhesive composition for a long period of time before heating to bond the fiber within the ferrule, such as 8 hours, 16 hours, 1 day, 1 week, 1 month, 6 months, 1 year, or even several years.

As used herein, an "adhesive" is a substance capable of holding materials together by surface attachment. In one embodiment, the adhesive composition of adhesive plug 34 may generally comprise a partially cross-linked resin and a coupling agent. In some embodiments, there may be between about 0.1 to about 10 parts by weight of the coupling agent per 100 parts by weight of the partially cross-linked resin. In various embodiments, there may be about 0.1, about 0.5, about 1, about 2, about 4, about 6, about 8, or about 10 parts by weight of the coupling agent per 100 parts by weight of the partially cross-linked resin, or a range between any combination of the above mentioned weight ratios.

As used herein, a "thermoplastic resin" is a material that comprises a polymeric material that will repeatedly soften when heated and harden when cooled, without polymer chains cross-linking. For example, a thermoplastic resin may be repeatedly made soft and hard through heating and cooling cycles. As used herein, "cross-linking" or "cross-linked" refers to the chemical bonding that connects a polymer chain to an adjacent polymer chain, and "cross-linkable" describes a chemical species that becomes at least partially cross-linked when sufficient heat is applied. As used herein, "partially cross-linking" or "partially cross-linked" refers to chemical bonding that connects a polymer chain to an adjacent polymer chain where not all adjacent chains are bonded, in contrast to thermoplastic and thermoset resins; and "partially cross-linkable" describes a chemical species that becomes partially cross-linked when sufficient heat is applied. It should be understood that when the terms "partially cross-linked" and "partially cross-linkable" are used to describe polymers of adhesive compositions described herein, the same resin is being described at a specific time of prior to cross linking or following cross-linking.

For example, a resin may be described as partially cross-linkable when it is packed into the ferrule and has not yet been heated to be partially cross-linked. Following heating, the resin may be partially cross-linked. In another embodiment, the resin may be cross-linked prior to the heating step immediately prior to the insertion of the optical fiber, such as if the adhesive composition is injection molded prior to being placed into the ferrule. However, an injection molded adhesive composition may still be described as partially cross-linkable, as cross-linking may take place in the heating step immediately prior to optical fiber insertion. It should further be understood that when the adhesive composition is described herein, if the adhesive composition is said to comprise a partially cross-linked resin then that is equivalent to saying that the adhesive composition comprises a partially cross-linkable resin prior to that cross linking step. While cross-linking may provide a permanence to fix structures securely together during connector assembly and thermoplastic resins may allow for materials to flow in a controlled manner for ferrule manufacturing, partially cross-linking materials may uniquely and synergistically have such advantages of both types of materials.

In one embodiment, the adhesive composition may comprise the property that at least about 5% by weight of the resin is cross-linked or cross-linkable and at least about 5% by weight of the resin is not cross-linked or cross-linkable. In another embodiment, the adhesive composition may comprise the property that at least about 10% by weight of the resin is cross-linked or cross-linkable and at least about 10% by weight of the resin is not cross-linked or cross-linkable. In another embodiment, the adhesive composition may comprise the property that at least about 20% by weight of the resin is cross-linked or cross-linkable and at least about 20% by weight of the resin is not cross-linked or cross-linkable.

In some embodiments, the partially cross-linked resin materials may have a melting point at temperatures of at least about 250° C., 270°, or 290° C. In some embodiments, the partially cross-linked resin materials may crosslink in the presence of air at temperatures of at least about 300° C., 325° C., or 350° C. Additionally, the partially cross-linked resin may be capable of bonding in less than about 5 minutes, 3 minutes, 1 minute, 30 seconds, or even 15 seconds. In contemplated embodiments, the partially cross-linked resin does not require mixing, does not de-air, and/or does not have potlife issues. In one embodiment, the adhesive composition may comprise one or more partially cross-linked resins such as, but not limited to, a partially cross-linked poly(phenylene sulfide).

In other embodiments, the adhesive composition may comprise one or more partially or non-partially cross-linked resins such as, but not limited to, a poly(phenylene oxide), a polyamide-imide, a liquid crystal polymer, a polyether ether ketone, a cyclic olefin copolymer, or combinations thereof. For example, the poly(phenylene sulfide) may comprise, but is not limited to, Ryton® V-I, available from Chevron Phillips Chemical Company LLC of The Woodlands, Tex., or Fortron® 0205P4 or Fortron® 0203P6, available from Ticona GmbH of Frankfurt, Germany. The poly(phenylene oxide) may comprise, but is not limited to, Sabic SA-102, available from SABIC of Riyadh, Saudi Arabia. The liquid crystal polymer may comprise Veectra® A950 VF300I, available from Ticona of Florence, Ky. The polyether ether ketone may comprise Ketaspire® KT-85I, available from Solvay S.A. of Brussels, Belgium. The cyclic olefin copolymer may comprise TOPAS® 5013L-10 from Topas Advanced Polymers.

The coupling agent may comprise a wide variety of one or more suitable coupling agents. In one embodiment, the coupling agent may comprise an epoxy, amino, or mercapto-functional silane. The silane group on the coupling agent may comprise an alkoxysilane, an oxime silane, an acetoxy silane. Alternatively, or in combination with the above mentioned silane coupling agent, the coupling agent may comprise a zirconate, a titanate, or combinations thereof. In one embodiment, the coupling agent may comprise glycidoxypropyl trimethoxysilane, such as gamma-glycidoxypropyltrimethoxy silane. For example, the coupling agents may comprise Silquest® A-I87, Silquest® A-1100, available from Crompton Corp. of Middlebury, Conn., or Ken-React® KR55, available from Kenrich Petrochemicals, Inc. of Bayonne, N.J.

The combination of a coupling agent and a partially cross-linked resin may produce enhanced adhesion strength. Without being bound by theory, it is believed that the coupling agent may provide a chemical coupling between the inorganic surface of the optical fiber and/or the ferrule, and the polymer matrix of the adhesive. After cooling, the partially cross-linked resin, which may have no functional groups which can react with inorganic surfaces, may be covalently bonded to one or both of the optical fiber or ferrule by the coupling agent. The coupling agent may comprise functional groups specifically capable of bonding covalently to inorganic materials, and groups specifically capable of reacting with organic functional groups. The organic functional group on the coupling agent can comprise epoxy, amino, mercapto, acrylic ester or any other organic functional group. In one embodiment, the functional group on the coupling agent which reacts with the inorganic materials is an alkoxysilane. Other possible groups include an oxime- or acetoxy-silane. In addition to silane coupling agents, zirconates and titanates have also been shown to have such coupling capabilities.

The adhesive composition described herein may further comprise at least one thermoset resin. A wide variety of thermoset resin materials may be used as a component of the adhesive composition. As used herein, a "thermoset resin" is a material that comprises at least one polymeric material that will undergo or has undergone a chemical reaction by the action of heat, catalysts, ultraviolet light, etc., leading to a relatively infusible state. Examples of suitable thermoset resins may include, but is not limited to, epoxy resins, such as Bisphenol A based epoxy or epoxy novo lacs. In one embodiment, there may be between about 1 to about 85 parts by weight of the thermoset resin per 100 parts by weight of the partially cross-linked resin. In various embodiments, there may be about 1, about 5, about 10, about 30, about 50, about 70, about 80, or about 85 parts by weight of the thermoset resin per 100 parts by weight of the partially cross-linked resin, or a range between any combination of the above mentioned weight ratios.

The combination of a thermoset resin and a partially cross-linked resin may produce enhanced adhesion strength. Without being bound by theory, it is believed that after cure at temperature above 300° C., the adhesive may form a uniform system of thermoplastics and a cross linked network structures throughout the matrix. The cross-link structure may be formed not only by the thermoset but also between thermoplastics and thermoset. For example, the partially cross-linked thermoplastic resin could react with the thermoset resin at elevated temperatures by a phenol group at the end of the polymer chain. The formed network structure may improve integrity of the adhesives and corresponding fiber optic connectors to resist environmental aging and creep under shear stress and promote bonding strength on the substrates.

In one embodiment, the adhesive composition may further comprise a curing agent. Without being bound by theory, it is believed that the curing agent may aid in curing the thermoset resin, such as an epoxy resin, if the adhesive composition comprises a thermoset resin, and/or may aid in curing the coupling agent. For example, the curing agent may react with the epoxy groups of a coupling agent and/or thermoset resin. The curing agent may comprise one or more curing agents available, such as, but not limited to, an anhydride curative, an amide curative, an aromatic amine curative, a dianhydride, a mono acid anhydride, a guanidine compound, an amine curative, or combinations thereof. For example, the curing agent may comprise a dicyandiamide, pyromellitic dianhydride, a dodecylsuccinic anhydride, a urone, a urea, a melamine, a dicyandiamide, or combinations thereof. In one embodiment, the adhesive composition further comprises between about 0.2 to about 50 parts by weight of a curing agent per 100 parts by weight of the coupling agent. In various embodiments, there may be about 0.2, about 0.5, about 1, about 5, about 10, about 20, about 30, about 40, or about 50 parts by weight of the curing agent per 100 parts by weight of the coupling agent, or a range between any combination of the above mentioned weight ratios. In another embodiment, the adhesive composition further comprises between about 0.2 to about 50 parts by weight of a curing agent per 100 parts by weight of the thermoset resin. In various embodiments, there may be about 0.2, about 0.5, about 1, about 5, about 10, about 20, about 30, about 40, or about 50 parts by weight of the curing agent per 100 parts by weight of the thermoset resin, or a range between any combination of the above mentioned weight ratios. In yet another embodiment, the adhesive composition further comprises between about 0.2 to about 100 parts by weight of a curing agent per 100 parts by weight of the sum of the weight of the thermoset resin and the weight of the coupling agent. In various embodiments, there may be about 0.2, about 0.5, about 1, about 5, about 10, about 30, about 50, about 70, about 90, or about 100 parts by weight of the curing agent per 100 parts by weight of the sum of the weight of the thermoset resin and the weight of the coupling agent, or a range between any combination of the above mentioned weight ratios.

In one embodiment, the adhesive composition may further comprise one or more filler materials. In one embodiment, the filler material is a mineral composition, such as at least one pyrophosphate of a metal. For example, the metal may comprise cobalt or magnesium, such that the filler material is magnesium pyrophosphate, cobalt pyrophosphate, or combinations thereof. In one embodiment, the adhesive composition further comprises between about 0.5 to about 85 parts by weight of a filler material per 100 parts by weight of the partially cross-linked resin. In various embodiments, there may be about 0.5, about 1, about 5, about 10, about 30, about 50, about 70, about 80, or about 85 parts by weight of the filler material per 100 parts by weight of the thermoset resin, or a range between any combination of the above mentioned weight ratios.

In one embodiment, the filler material may comprise a material with a negative coefficient of thermal expansion. As used herein, a material with a negative coefficient of thermal expansion refers to a material that goes through a phase inversion with the accompanying decrease in volume at a temperature near to, for example within about 50° C., about 30° C., about 20° C., or about 10° C., of the glass transition temperature of the partially cross-linked resin. Without being bound by theory, it is believed that the inclusion of a material with a negative coefficient of thermal expansion may aid in maintaining the density, and therefore the volume, of the adhesive composition when it is heated, such that it does not expand as to apply excessive pressure to the ferrule, in some circumstances causing the ferrule to crack or rupture.

It should be understood that various components of the adhesive composition embodiments disclosed herein may be combined in any combination in any ratio disclosed herein. Such various components include partially cross-linked thermoplastic resins, coupling agents, thermoset resins, curing agents, and filler materials. Furthermore, while desirable properties of the adhesive composition may be caused by the combination of only two or more of the various components, any combination of the components is contemplated herein. It should further be understood that where a component of the adhesive composition is referenced, it may be an optional component is some embodiments, and is not required to be in the adhesive composition is all embodiments.

For example, in one preferred embodiment, the adhesive composition may comprise a partially cross-linked resin, a coupling agent, curing agent, and partially cross-linked resin. The adhesive composition may comprise between about 0.1 to about 10 parts by weight of the coupling agent per 100 parts by weight of the partially cross-linked resin, between about 0.2 to about 5 parts by weight of a curing agent per 100 parts by weight of the partially cross-linked resin, and between about 0.5 to about 85 parts by weight of a filler material per 100 parts by weight of the partially cross-linked resin.

In one embodiment, the adhesive composition is prepared as a solid powder. At least some of the various components of the adhesive composition may be solid, and may be ground into a powder, such as any or all of the partially cross-linked resin, the thermoset resin, the curing agent, and/or the filler material. The solid powder materials may be thoroughly mixed. In one embodiment, the coupling agent may be a liquid. However, the fraction of coupling agent in the blend is relatively small so the coupling agent may be combined with one of the solid components of the adhesive composition and the resulting blend may be a free-flowing powder. For example, in one embodiment, the coupling agent may be pre-reacted with the thermoplastic powders in an organic solvent under refluxing conditions. After removal of the solvent, the treated powder remains. Under the conditions of refluxing solvent, some of the coupling agent may have become permanently bonded to the polymer. Additional embodiments of adhesive compositions that may be used form adhesive plug 34 and/or conjunction with the optical connectors discussed herein are disclosed in detail in U.S. application Ser. No. 13/799,255, filed Mar. 13, 2013, which is incorporated herein by reference in its entirety.

Figure 7:
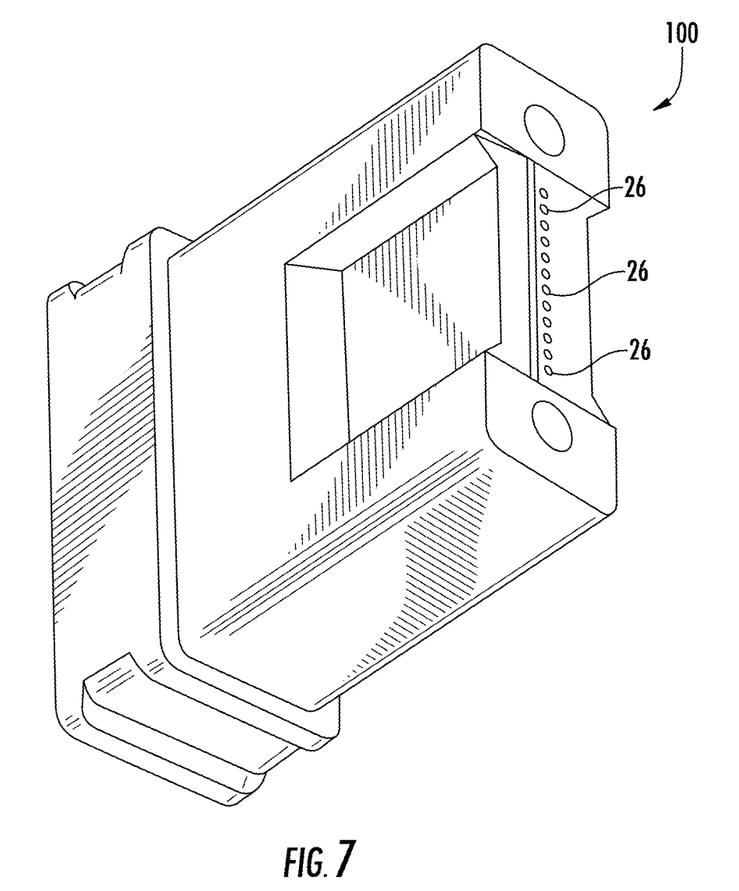
FIG. 7 shows a multi-fiber optical connector according to an exemplary embodiment.

It should be understood while FIGS. 1-6 describe an adhesive loaded ferrule configured to be coupled to a single optical fiber, the adhesive compositions, ferrule central bore structure and structure of adhesive plug 34 may be utilized in a wide variety of fiber optic connector applications. For example, a multi-fiber connector 100 as shown in FIG. 7 may include a plurality central bores 26 and plurality of adhesive plugs 34 according to the various embodiments discussed herein. In other embodiments, the embodiments discussed herein may also be employed with mechanical splice fiber optic connectors. Examples of various single fiber mechanical splice connectors are provided in U.S. Pat. Nos. 4,755,018; 4,923,274; 5,040,867; and 5,394,496. Examples of various multi-fiber mechanical splice connectors are provided in U.S. Pat. Nos. 6,173,097; 6,379,054; 6,439,780; and 6,816,661.

In various embodiments, a method of forming an optical connector preloaded within an adhesive composition is provided. The method includes providing an optical connector, and the optical connector includes a body having a first face and a second face, and a fiber-receiving passage defined in the body that extends between a first opening formed in the first face and a second opening formed in the second face. The fiber receiving passage includes a first passage section extending inwardly from the first face, and the first passage section has a first diameter. The fiber receiving passage includes a second passage section extending inwardly from the second face, and the second passage section has a second diameter. The second diameter is less than the first diameter. The fiber receiving passage includes a tapered passage section located between the first passage section and the second passage section and having a variable diameter, and the variable diameter of the tapered section decreases as the distance to the second face decreases. The method includes placing an adhesive composition within the tapered passage section, and storing the optical connector for at least one day following the placing step, without coupling the optical connector to an optical fiber. In various embodiments, the method may include coupling the adhesive composition to an interior surface of the body at the tapered passage section. In various embodiments, the coupling step includes solidifying the adhesive composition within the tapered passage section after the placing of the adhesive composition. In various embodiments, the placing step may be at a first location (e.g., a facility for manufacturing the connector), and the method may further include transporting the optical connector to a second location at which an optical fiber is coupled to the optical connector.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical fiber may comprise an inner primary coating and an outer secondary coating. Optical fiber coatings may be applied in concentric layers.

The optical connectors discussed herein may typically comprise a ceramic material, such as, but not limited to, zirconia, alumina, titanium-doped alumina, glass-filled PPS, or combinations thereof. However, other materials of construction of the ferrule are contemplated herein, such as metals, ceramics, polymers, or combinations thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber connector, comprising:
   a body having a first face and a second face;
   a fiber-receiving passage defined in the body, extending between a first opening formed in the first face and a second opening formed in the second face, the fiber receiving passage configured to receive an optical fiber, the passage comprising:
   a first passage section extending inwardly from the first face, the first passage section having a first width;
   a second passage section extending inwardly from the second face, the second passage section having a second width, wherein the second width is less than the first width; and
   a transition passage section located between the first passage section and the second passage section and having a variable width, wherein the variable width of the transition section decreases as the distance to the second face decreases; and a meltable adhesive composition located within the transition passage section, wherein the adhesive composition is configured to bind an optical fiber to an inner surface of the second passage following melting and solidification of the adhesive composition;

wherein the transition passage section has a first end and a second end, wherein an inner end of the first passage section transitions into the first end of the transition passage section and the second end of the transition passage section transitions into an inner end of the second passage section;

wherein the meltable adhesive composition is a solid material when the temperature of the body is less than 40 degrees C. and that extends between opposing inner surfaces of the transition passage section, such that an opening formed at the inner end of the of the second passage section is blocked by the meltable adhesive composition.

2. The optical fiber connector of claim 1, wherein the meltable adhesive is a solid powdered adhesive composition coupled to the transition passage section via compression of the solid powdered adhesive within the transition passage section.

3. The optical fiber connector of claim 2, wherein the meltable adhesive composition comprises a cross-linkable resin and a coupling agent.

4. The optical fiber connector of claim 3, wherein the meltable adhesive composition comprises between 0.1 to 10 parts by weight of coupling agent per 100 parts by weight of the cross-linkable resin.

5. The optical fiber connector of claim 3, wherein the cross-linkable resin has a melting point greater than 290 degrees C.

6. The optical fiber connector of claim 1, wherein at least 95% of the solid meltable adhesive composition is located between an axial midpoint of the body and the second end of the transition passage section.

7. The optical fiber connector of claim 1, wherein all of the solid meltable adhesive composition is located between an axial midpoint of the body and the second face, wherein the meltable adhesive composition is adhered to an inner surface of the transition passage section such that the adhesive composition is maintained within the passage.

8. The optical fiber connector of claim 1, wherein the first passage section is a cylindrical bore extending from the first face to the first end of the transition passage section and the first width is a first diameter, wherein the second passage is a cylindrical bore extending from the second face to the second end of the transition passage section and the second width is a second diameter, wherein the first diameter is at least twice the second diameter, wherein an axial length of the first passage section is greater than half an axial length of the body, wherein an axial length of the second passage section is greater than an axial length of the transition passage section and is less than a third of the axial length of the body.

9. The optical fiber connector of claim 8, wherein the first diameter is at least four times the second diameter.

10. The optical fiber connector of claim 8, wherein the transition passage section includes a frustoconical inner surface.

11. The optical fiber connector of claim 10, wherein the frustoconical inner surface is at an angle between 30 degrees and 80 degrees relative to a longitudinal axis of the body.

12. The optical fiber connector of claim 10, wherein the frustoconical inner surface is located between an axial midpoint of the body and the second face.

13. The optical fiber connector of claim 1, wherein the temperature of the body at the first face is less than 250 degrees C. and the temperature of the body at the position of the meltable adhesive composition is greater than 290 degrees C., wherein the adhesive composition is flowable.

14. The optical fiber connector of claim 13, further comprising an optical fiber extending through the fiber receiving passage from the first face to the second face, wherein the adhesive composition is also located in the second passage section and surrounds an outer surface of the optical fiber and filling a space between the outer surface of the optical fiber and an inner surface of the second passage section.

15. An optical fiber connector, comprising:
a body having a first face, a second face opposing the first face, and a length between the first face and the second face, the body being an integral, single body extending between the first face and the second face;
a through bore extending from the first face to the second face, the through bore comprising:
a first section extending inwardly from the first face, the first section having a first diameter;
a second section extending away from the first section to the second face, the second section having an entrance opening facing the first section, an exit opening formed in the second face and a second diameter, wherein the first diameter is at least twice the second diameter; and
a frustoconical section located between the first section and the second section, the frustoconical section providing a transition from the first diameter of the first section to the second diameter of the second section; and
a solid powdered adhesive composition coupled to the body within the frustoconical section adjacent the entrance opening of the second section via compression of the solid powdered adhesive within the frustoconical section, wherein the solid powdered adhesive composition includes a cross-linkable resin.

16. The optical fiber connector of claim 15 wherein solid powdered adhesive composition has a melting temperature greater than 290 degrees C.

17. The optical fiber connector of claim 15, wherein an inner surface of the frustoconical section is at an angle between 30 degrees and 80 degrees relative to a longitudinal axis of the body.

18. The optical fiber connector of claim 17, wherein an axial length of the first section of the through bore is greater than half the axial length of the body, wherein an axial length of the second section of the through bore is greater than an axial length of the frustoconical section and is less than a third of the axial length of the body, wherein the body has an outer diameter and the first diameter is greater than 30% of the outer diameter of the body.

19. The optical fiber connector of claim 18, wherein the first diameter is at least four times the second diameter.

20. An optical fiber connector, comprising:
a body having a first face, a second face, and an outer diameter;
a fiber-receiving passage defined in the body, extending between a first opening formed in the first face and a second opening formed in the second face, the fiber receiving passage configured to receive an optical fiber, the passage comprising:

a first passage section extending inwardly from the first face to an inner end, the first passage section having a first diameter and extending more than half an axial length of the body, wherein the first diameter is between 30% and 50% of the outer diameter of the body;

a tapered section extending from the inner end of the first passage section; and a second passage section extending from a narrow end of the tapered section to the second face, the second passage section having a second diameter, wherein the first diameter is at least twice the second diameter; and a meltable solid powdered adhesive composition coupled to the body within the tapered section via compression, wherein the meltable solid powdered adhesive composition includes a cross-linkable resin and has a melting point greater than 290 degrees C., wherein at least 50% of the meltable solid powdered adhesive composition is located within the tapered section.

21. The optical fiber connector of claim 20, wherein the temperature of the body is room temperature, wherein the meltable solid powdered adhesive composition forms a solid structure that extends between opposing inner surfaces of the tapered section, such that an opening formed at the narrow end of the tapered section adjacent the second passage section is blocked by the adhesive composition.

22. The optical fiber connector of claim 20, wherein the second passage section includes an entrance facing the narrow end of the tapered section, wherein the entrance is blocked by the meltable solid powdered adhesive composition.

23. The optical fiber connector of claim 20, wherein the first diameter is at least four times the second diameter, wherein the tapered section includes a frustoconical inner surface.

24. The optical fiber connector of claim 23, wherein the frustoconical inner surface is located between an axial midpoint of the body and the second face, wherein the meltable solid powdered adhesive composition extends between opposing portions of the frustoconical inner surface.

25. An optical fiber connector, comprising:
a body having a first face and a second face;
a fiber-receiving passage defined in the body that extends between a first opening formed in the first face and a second opening formed in the second face, the fiber receiving passage configured to receive an optical fiber, the passage comprising:
    a first passage section extending inwardly from the first face, the first passage section having a first width; and
    a second passage section extending inwardly from the second face, the second passage having an inner entrance at an inner end of the second passage, the second passage section having a second width, wherein the second width is less than the first width; and
a solid, meltable adhesive composition located within the passage blocking the inner entrance at the inner end of the second passage section, wherein the solid, meltable adhesive composition is configured to bind an optical fiber to an inner surface of the second passage following melting and solidification of the adhesive composition.

26. The optical fiber connector of claim 25, further comprising a transition passage section located between the first passage section and the second passage section and having a variable width, wherein the variable width of the transition section decreases as the distance to the second face decreases, wherein the first width is at least four times the second width.

27. The optical fiber connector of claim 26, wherein the solid, meltable adhesive composition is a solid powdered adhesive composition coupled to the transition passage section via compression within the transition passage section.

28. The optical fiber connector of claim 26, wherein the transition passage is a tapered section, wherein the solid, meltable adhesive composition extends between opposing inner surfaces of the tapered section.

29. The optical fiber connector of claim 28, wherein at least 50% of the solid, meltable adhesive composition is located within the tapered section.

30. The optical fiber connector of claim 25, wherein the solid, meltable adhesive composition comprises a material that is solid when the temperature of the body is less than 40 degrees C.

* * * * *

UNITED STATES PATENT AND TRADEMARK OFFICE
Certificate

Patent No. 8,702,322 B1                                                                 Patented: April 22, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeffrey Dean Danley, Hickory, NC (US); Robert Bruce Elkins, II, Hickory, NC (US); Darrin Max Miller, Hickory, NC (US); Dennis Craig Morrison, Lincolnton, NC (US); Edward John Fewkes, Corning, NY (US); John Paul Krug, Painted Post, NY (US); and Ziwei Liu, Fort Worth, TX (US).

Signed and Sealed this Sixteenth Day of September 2014.

*MARK ROBINSON*
*Supervisory Patent Examiner*
Art Unit 2883
Technology Center 2800